June 30, 1925.  
C. H. BIHL  
COTTON CHOPPER  
Filed Aug. 29, 1924
1,544,211
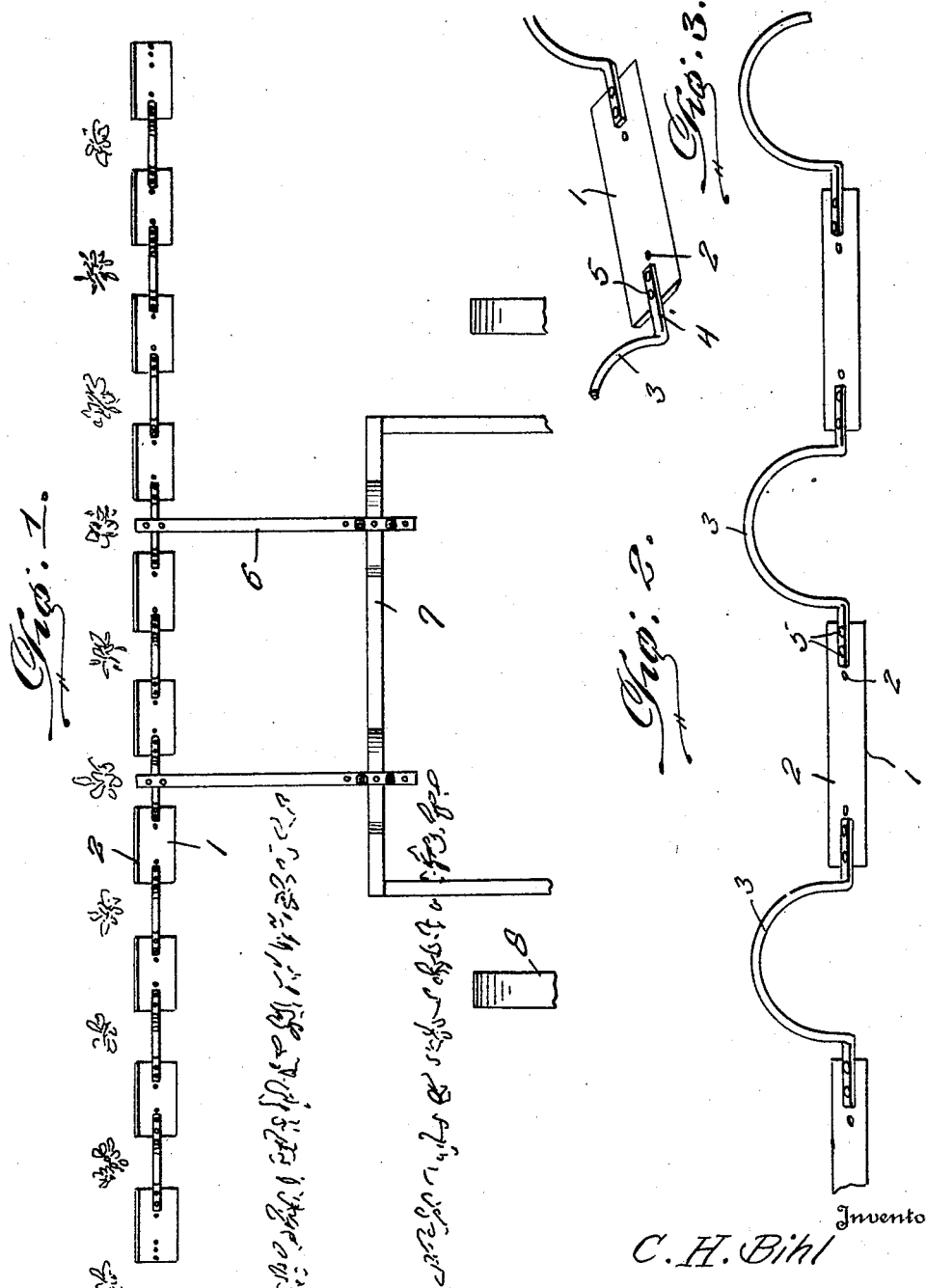

Patented June 30, 1925.

1,544,211

UNITED STATES PATENT OFFICE.

CHARLES H. BIHL, OF IRA, TEXAS.

COTTON CHOPPER.

Application filed August 29, 1924. Serial No. 734,920.

*To all whom it may concern:*

Be it known that I, CHARLES H. BIHL, a citizen of the United States, residing at Ira, in the county of Scurry and State of Texas, have invented certain new and useful Improvements in a Cotton Chopper, of which the following is a specification.

This invention relates to cotton choppers and it consists in the novel features hereinafter described and claimed.

An object of the invention is to provide a chopper of simple and durable form adapted to be applied to a frame which may be moved over the surface of the soil whereby the said chopper may be drawn transversely across the rows of standing plants and chop out or block out the superfluous plants, thereby leaving the plants which constitute the crop standing in hills at regular intervals.

With the above object in view the cotton chopper comprises a series of blades which are preferably rectangular in plan. The said blades are connected together at their end portions by arch members and the ends of the adjacent blades are spaced from each other by the said arch members. Bars are connected with certain of the intermediate arch members and may be connected with a frame whereby the cotton chopper may be moved transversely across the rows of plants as hereinbefore stated.

In the accompanying drawing:

Figure 1 is a plan view of the cotton chopper showing the same applied to a frame.

Figure 2 is a fragmentary enlarged front elevational view of the cotton chopper.

Figure 3 is a perspective view of one of the blades of the cotton chopper with fragments of the arch members applied thereto.

The cotton chopper comprises a series of blades 1, each of which is provided in the vicinity of its ends with a series of spaced perforations 2. Arch members 3 are provided at their ends with substantially radially disposed portions 4 which are secured by means of bolts 5 to the blades 4, the said bolts passing through the openings 2 of the blades. Bars 6 are connected at their rear ends with certain of the intermediate arch members 3 and the said bars 6 are connected at their forward ends with a frame 7 which is mounted upon wheels 8 indicated in Figure 1 of the drawing.

It will be seen that by adjusting the bolts 5 in the openings 2 the spaces between the adjacent ends of the blades 1 may be increased or diminished. In operation the frame 7 is moved transversely across the rows of standing plants and the blades 1 are drawn behind the frame. As the blades 1 move transversely across the rows of plants those plants with which they come in contact are cut out of the rows and the plants which pass through the spaces between the ends of the adjacent blades are left standing in the rows and thus the superfluous plants are chopped out of the rows and those plants which remain standing are in blocks which are spaced at regular intervals apart.

Having thus described the invention, what I claim is:—

1. A cotton chopper comprising a series of blades arranged in a row and spaced from each other and arch members connected at their ends with the blades and bridging the space between the blades.

2. A cotton chopper comprising blades arranged in a row and spaced from each other, each blade being provided at its end portions with series of openings, arch members having bolts passing through their end portions and which pass through the openings of the blade, the said arch members bridging the spaces between the blades.

3. A cotton chopper comprising a series of blades which are rectangular in plan and arranged in a row, said blades being spaced from each other and arch members having substantially radially disposed end portions which are mounted upon the blades, the said arch members bridging the spaces between the blades.

In testimony whereof I affix my signature.

CHARLES H. BIHL.